United States Patent
Enokido

(10) Patent No.: US 7,136,561 B2
(45) Date of Patent: Nov. 14, 2006

(54) TWO-DIMENSIONAL PHOTONIC CRYSTAL, AND WAVEGUIDE AND RESONATOR USING THE SAME

(75) Inventor: Yasushi Enokido, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/529,492

(22) PCT Filed: Feb. 12, 2004

(86) PCT No.: PCT/JP2004/001468

§ 371 (c)(1),
(2), (4) Date: Mar. 29, 2005

(87) PCT Pub. No.: WO2004/086102

PCT Pub. Date: Oct. 7, 2004

(65) Prior Publication Data

US 2006/0024011 A1   Feb. 2, 2006

(30) Foreign Application Priority Data

Mar. 26, 2003 (JP) ............................. 2003-084893

(51) Int. Cl.
*G02B 6/10* (2006.01)
*G02B 6/20* (2006.01)

(52) U.S. Cl. .................. 385/129; 385/125; 385/131
(58) Field of Classification Search ................ 385/123, 385/125, 129–132
See application file for complete search history.

(56) References Cited

U.S. PATENT DOCUMENTS

| | | | |
|---|---|---|---|
| 5,172,267 A | | 12/1992 | Yablonovitch |
| 6,496,632 B1 * | | 12/2002 | Borrelli et al. .............. 385/123 |
| 6,542,682 B1 * | | 4/2003 | Cotteverte et al. .......... 385/125 |
| 6,591,035 B1 * | | 7/2003 | Miller et al. ................... 385/24 |
| 6,618,535 B1 * | | 9/2003 | Reynolds ..................... 385/129 |
| 6,728,457 B1 * | | 4/2004 | Sigalas et al. .............. 385/125 |
| 6,914,715 B1 * | | 7/2005 | Nakazawa et al. .......... 359/321 |
| 6,931,191 B1 * | | 8/2005 | Kitagawa et al. ........... 385/129 |
| 2002/0051275 A1 | | 5/2002 | Tokushima |
| 2002/0197042 A1 * | | 12/2002 | Kittaka et al. .............. 385/131 |
| 2005/0069269 A1 * | | 3/2005 | Libori et al. ................ 385/125 |

(Continued)

FOREIGN PATENT DOCUMENTS

EP    1 248 123 A2    10/2002

(Continued)

OTHER PUBLICATIONS

Knobloch, Edgar et al. "Doubly Diffusive Waves", Contemporary Mathematics, vol. 56, pp. 203-216 1986.

*Primary Examiner*—John D. Lee
*Assistant Examiner*—Rhonda S. Peace
(74) *Attorney, Agent, or Firm*—Oblon, Spivak, McClelland, Maier & Neustadt, P.C.

(57) ABSTRACT

A tetragonal lattice is formed by first cylindrical structural members, and a photonic crystal has a periodical structure formed by a periodical arrangement of such tetragonal lattice. A distance between center points of the first cylindrical structural members is taken as a unit length a, which constitutes a lattice constant of the tetragonal lattice. At an approximate center of the tetragonal lattice, a cylindrical structural member is provided, and a dielectric area is provided around the first cylindrical structural members and the second cylindrical structural member. This structure allows the formation of a photonic band gap for a TE wave and a photonic band gap for a TM wave in a certain common frequency region, thereby forming a complete band gap.

14 Claims, 7 Drawing Sheets

U.S. PATENT DOCUMENTS

2005/0147371 A1* 7/2005 Noda et al. .................. 385/129
2005/0238307 A1* 10/2005 Hansen et al. ............... 385/125
2006/0029349 A1* 2/2006 Hoshi et al. ................. 385/129

FOREIGN PATENT DOCUMENTS

| | | |
|---|---|---|
| JP | 2000-249828 | 9/2000 |
| JP | 2000-352631 | 12/2000 |
| JP | 2001-272555 | 10/2001 |
| JP | 2002-162525 | 6/2002 |
| JP | 2002-303713 | 10/2002 |
| JP | 2002-365401 | 12/2002 |
| JP | 2003-4901 | 1/2003 |
| JP | 2003-149477 | 5/2003 |

* cited by examiner

| | | r2 | | | | | | | | | |
|---|---|---|---|---|---|---|---|---|---|---|---|
| | | 0.05a | 0.1a | 0.15a | 0.2a | 0.25a | 0.3a | 0.35a | 0.4a | 0.45a | 0.5a |
| r1 | 0.1a | – | – | – | – | – | – | 6.39 | 2.70 | – | – |
| | 0.2a | – | – | – | – | 2.48 | 2.65 | 2.69 | – | – | – |
| | 0.3a | – | – | – | 4.07 | 2.23 | 1.96 | – | – | – | – |
| | 0.4a | 2.70 | 1.81 | – | – | – | – | – | – | – | – |
| | 0.5a | – | – | – | – | – | – | – | – | – | – |

FIG. 4

| | | ε2 | | | | |
|---|---|---|---|---|---|---|
| | | 10 | 20 | 30 | 40 | 50 |
| r1 | 0.2a | – | 2.65 | 2.84 | 1.35 | 2.72 |
| | 0.25a | – | 1.03 | 2.05 | 1.72 | 1.88 |
| | 0.3a | – | – | – | 1.96 | 5.61 |

FIG. 5

| | | ε2/ε1 | | | | | |
|---|---|---|---|---|---|---|---|
| | | 4 | 8 | 16 | 22 | 32 | 50 |
| r1 | 0.2a | – | – | – | – | – | – |
| | 0.25a | – | – | – | – | – | 12.67 |
| | 0.3a | – | – | – | 3.56 | 11.95 | 20.87 |

US 7,136,561 B2

TWO-DIMENSIONAL PHOTONIC CRYSTAL, AND WAVEGUIDE AND RESONATOR USING THE SAME

TECHNICAL FIELD

The present invention relates to a photonic crystal adapted for use in a device for controlling an electromagnetic wave such as light, and more particularly to a two-dimensional photonic crystal capable of forming a complete photonic band gap to an electromagnetic wave of a specified wavelength region, and a waveguide and a resonator utilizing the same.

BACKGROUND ART

Recently, photonic crystals are becoming increasingly important as devices for controlling electromagnetic waves such as light. A photonic crystal is a periodical structured member showing a periodical change in a dielectric constant in crystal-constituting regions, with a periodical dielectric change comparable to a wavelength of an electromagnetic wave such as light, and can realize novel electromagnetic characteristics by an artificial periodical structure. Such structure is featured, like a band gap formation in a semiconductor substance by a Bragg reflection of electrons by periodical potentials of atomic nuclei, by a formation of band gap to an electromagnetic wave such as light, as such electromagnetic wave is subjected to a Bragg reflection by periodical distribution of refractive index. In a photonic crystal, such band gap is called a photonic band gap. Such photonic band gap, in which an electromagnetic wave such as light cannot exist, allows to arbitrarily control the electromagnetic wave such as light.

A band gap which inhibits a propagation of an electromagnetic wave such as light in all the directions is called a complete band gap. In case such complete band gap is made possible, an ultra small device can be prepared in a photonic crystal, by forming a point defect or a linear defect therein. For example, in case of artificially perturbing a part of a periodicity in the photonic crystal, a defect level is formed in the photonic band gap and an electromagnetic wave such as light is allowed to exist only in such defect level, and such phenomenon can be utilized for example in a resonator. Also in case of forming a linear defect, an electromagnetic wave such as light can propagate along an array of defects but cannot propagate in other areas than the defects, so that an ultra small waveguide can be formed.

Therefore, in order to exploit the characteristics of the photonic band gap, it is necessary to prepare a photonic crystal having a complete band gap.

As a photonic crystal structure having a wide complete band gap, there is known a photonic crystal having a three-dimensional periodical structure (hereinafter represented as three-dimensional photonic crystal) such as a Yablonovite structure (for example Patent Literature 1) or a Woodpile structure (for example Non-Patent Literature 1). Such crystals have a wide complete band gap, but are very difficult to produce because of structures thereof Also in case one of the plural dielectric substances constituting the photonic crystal is air, the three-dimensional periodical structure cannot be maintained when the dielectric substances are arranged three-dimensionally and in a non-contact manner as in a certain diamond or opal structure.

On the other hand, a photonic crystal having a two-dimensional periodical structure (hereinafter represented as two-dimensional photonic crystal) is easier to prepare in comparison with the three-dimensional photonic crystal. For example, as a two-dimensional photonic crystal having a complete band gap, there is known a two-dimensional photonic crystal constituted of a triangular lattice arrangement formed by a circular hole (for example Patent Literature 2). Also as a relatively easily produceable structure, a two-dimensional photonic crystal having a tetragonal lattice arrangement formed by circular holes or cylinders is known.

Also the photonic crystal is formed from two or more dielectric substances. Ordinarily there are employed two substances, one of which is often air because of an ease in manufacture and a low loss. For example, in the aforementioned two-dimensional photonic crystal constituted of a trigonal lattice structure or a tetragonal lattice structure, such trigonal lattice or tetragonal lattice is formed by air.

Patent Literature 1: U.S. Pat. No. 5,172,267

Patent Literature 2: JPA No. 2001-272555 (paragraph [0023], FIG. 1)

Non-Patent Literature 1: E. Knobloch, A. Deane, J. Toomre and D. R. Moore, Contemp. Math., 56, 203 (1986).

However, in the two-dimensional photonic crystal constituted of a trigonal lattice arrangement as described in Patent Literature 2, a widest complete band gap is obtained for r/a of 0.48 (wherein r is a radius of a circular hole and a is a lattice constant of the photonic crystal). Therefore, a thickness between the circular holes becomes as small as 0.04a, and such photonic crystal is very difficult to prepare.

Also a two-dimensional photonic crystal constituted of a tetragonal lattice structure, in case the tetragonal lattice is formed by circular holes, shows a band gap to a TE wave (transverse electric wave) of the incident electromagnetic wave but does not show a band gap to a TM wave (transverse magnetic wave). On the other hand, in case the tetragonal lattice is formed by cylinders, it shows a band gap to the TM wave but does not show a band gap to the TE wave. Therefore, a complete band gap cannot be obtained in the two-dimensional photonic crystals constituted by such tetragonal lattices.

Thus, there is required a two-dimensional photonic crystal that can be prepared easily and that shows band gaps to both the TE wave and the TM wave in all the incident angles in order to obtain a complete band gap.

On the other hand, as the photonic crystal is generally prepared by a semiconductor manufacturing technology and a photoforming technology, materials to be employed are limited to semiconductor materials and photosettable resins. These materials have relatively small relative dielectric constants, so that a wide band gap is difficult to obtain. A method of mixing a ceramic powder in a photosettable resin is also known, but a high relative dielectric constant cannot be obtained as the relative dielectric constant is governed by a logarithmic mixing rule and is principally influenced by the relative dielectric constant of the resin, so that a wide band gap is difficult to obtain.

DISCLOSURE OF INVENTION

The present invention is to solve the aforementioned difficulties, and an object thereof is to provide a two-dimensional photonic crystal which is easy to prepare and has a complete band gap to the TE wave and the TM wave in all the incident angles, and a waveguide and a resonator utilizing the same.

Another object of the invention is to provide a two-dimensional photonic crystal having a wide complete band gap utilizing a single ceramic material of a high relative dielectric constant, and a waveguide and a resonator utilizing the same.

Still another object of the invention is to increase the strength of the two-dimensional photonic crystal itself by utilizing a dielectric material other than air, thereby providing a two-dimensional photonic crystal that can be prepared easily. Also the invention, by utilizing a dielectric material other than air, enables to form a wider complete band gap and to achieve a relatively small size of a device utilizing the two-dimensional photonic crystal. Also the invention is to provide a two-dimensional photonic crystal capable of easily opening a band gap and reducing the loss by employing a ceramic material of a high relative dielectric constant, and a waveguide and a resonator utilizing the same.

A two-dimensional photonic crystal of the invention is a two-dimensional photonic crystal formed by a periodical two-dimensional arrangement of plural unit lattices, characterized in including a prism-shaped first dielectric area arranged in each lattice point of the unit lattice, a prism-shaped second dielectric area arranged at an approximate center of the unit lattice, and a third dielectric area adjacent to and around the first and second dielectric areas.

Also the two-dimensional photonic crystal of the invention is characterized in that the third dielectric area has a relative dielectric constant different from relative dielectric constants of the first and second dielectric areas.

In the present invention, the unit lattice is preferably a tetragonal lattice.

Also the first dielectric area and the second dielectric area preferably have a substantially cylindrical shape and satisfy a relationship:

$$0.4a \leq r1+r2 \leq 0.6a$$

wherein r1 indicates a radius of the cylindrical first dielectric area, r2 indicates a radius of the cylindrical second dielectric area, and a indicates a unit length of a lattice axis of the tetragonal lattice.

Also a relative dielectric constant $\in 1$ of the first dielectric area may be equal to or smaller than a relative dielectric constant $\in 2$ of the second dielectric area.

Also a relative dielectric constant $\in 3$ of the third dielectric area preferably satisfies at least a relation $\in 3 > \in 1$.

Further, a relative dielectric constant $\in 1$ of the first dielectric area, a relative dielectric constant $\in 2$ of the second dielectric area, and a relative dielectric constant $\in 3$ of the third dielectric area preferably satisfy relations:

$$\in 3 > \in 1 \text{ and } \in 2/\in 1 > 20.$$

The first and second dielectric areas may be formed by air and the third dielectric area may be formed by a dielectric material containing a ceramic material.

Also the first, second and third dielectric areas may be formed by a dielectric material containing a ceramic material.

Also a unit length a of the lattice axis of the tetragonal lattice is preferably different depending on a frequency of a light or an electromagnetic wave entering the two-dimensional photonic crystal.

Also a photonic crystal waveguide of the present invention is characterized in including the aforementioned two-dimensional photonic crystal in which a linear defect is formed in a periodical lattice arrangement of the two-dimensional photonic crystal.

Also a photonic crystal resonator of the present invention is characterized in including the aforementioned two-dimensional photonic crystal in which a point-shaped defect is formed in a periodical lattice arrangement of the two-dimensional photonic crystal.

BRIEF DESCRIPTION OF DRAWINGS

FIG. 4 is a table showing a result of simulation on a photonic crystal in a second embodiment of the invention.

FIG. 5 is a table showing a result of simulation on a photonic crystal in a third embodiment of the invention.

BEST MODE FOR CARRYING OUT THE INVENTION

Figure 1:
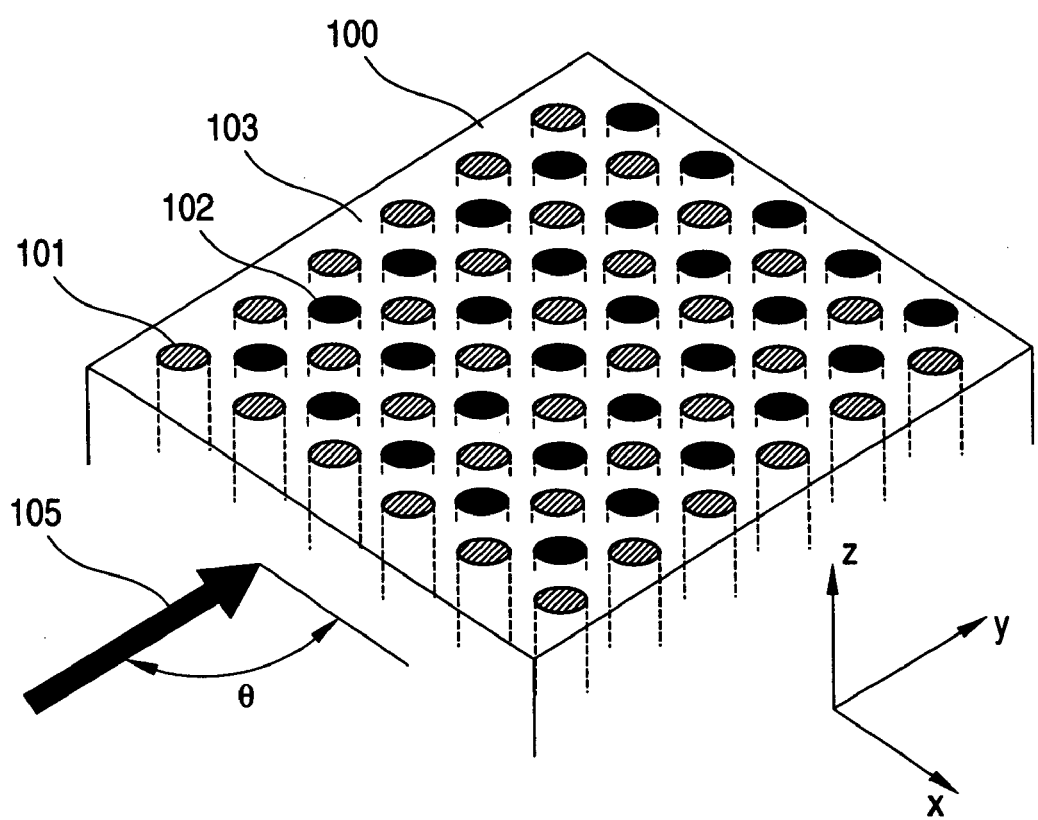
FIG. 1 is a perspective view showing a photonic crystalline structure embodying the present invention.
Figures 2, 3:
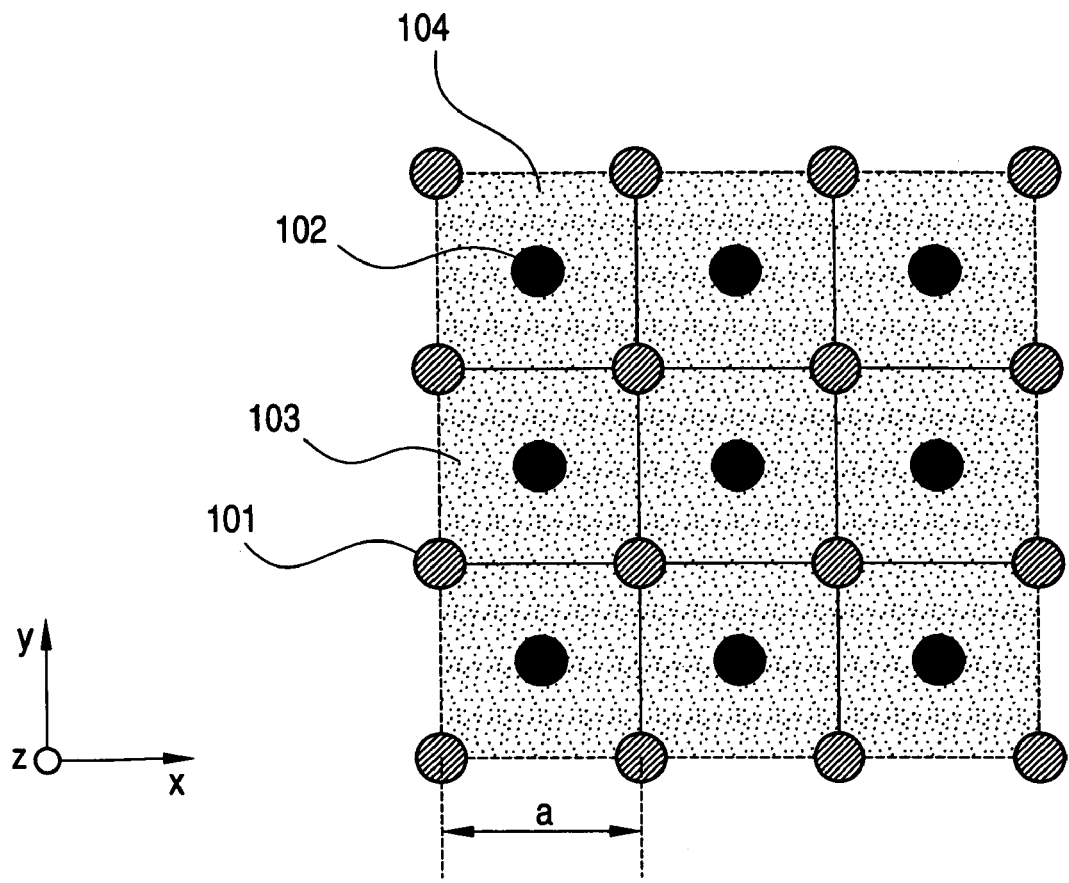
FIG. 2 is a plan view showing an arrangement of dielectric areas in an embodiment of the invention.
FIG. 3 is a table showing a result of simulation on a photonic crystal in a first embodiment of the invention.
Figure 6:
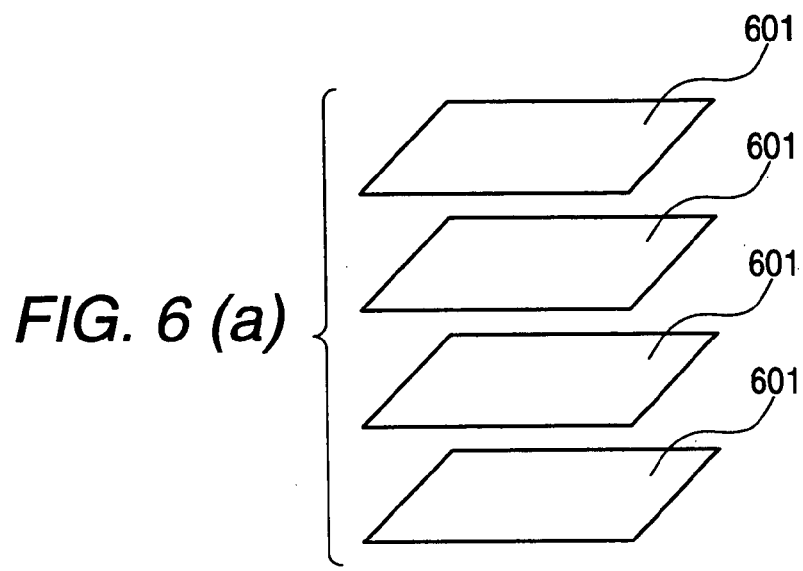
FIG. 6 is a view showing a manufacturing process of a photonic crystal in a first embodiment of the invention.
Figure 6:
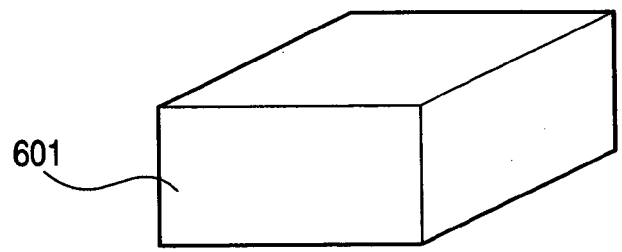
Figure 6:
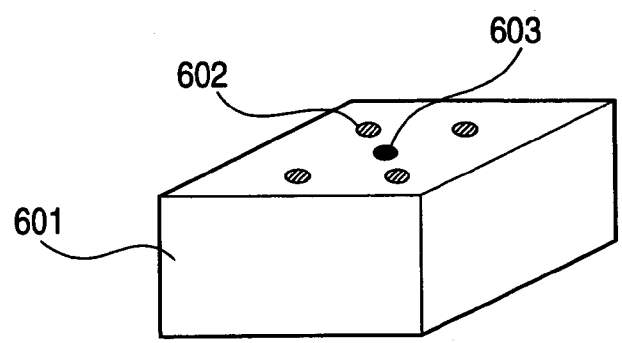
Figure 7:
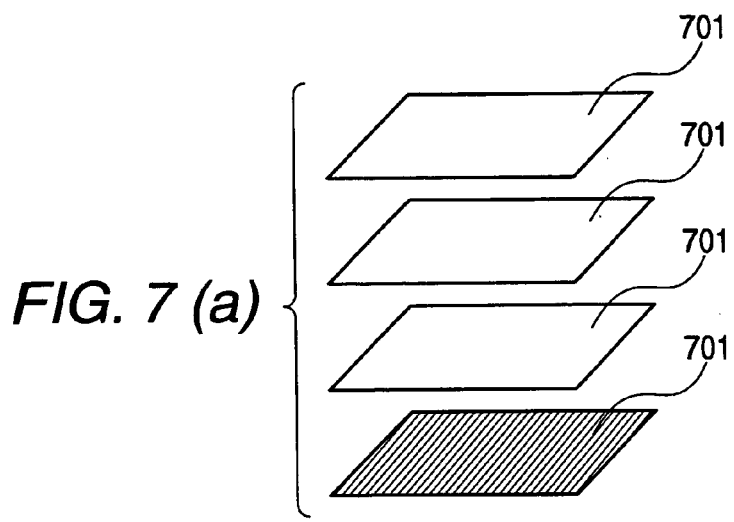
FIG. 7 is a view showing a manufacturing process of a photonic crystal in a second embodiment of the invention.
Figure 7:
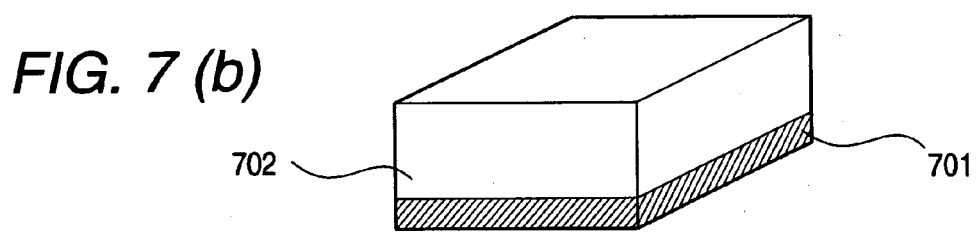
Figure 7:
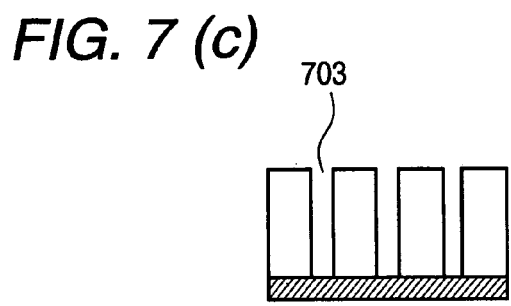
Figure 7:
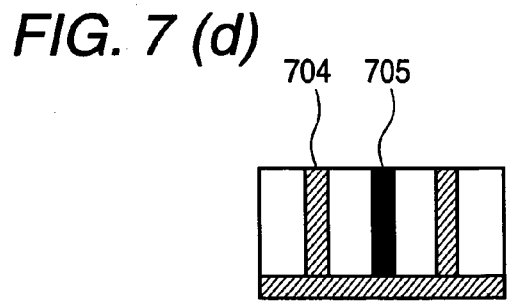
Figure 7:
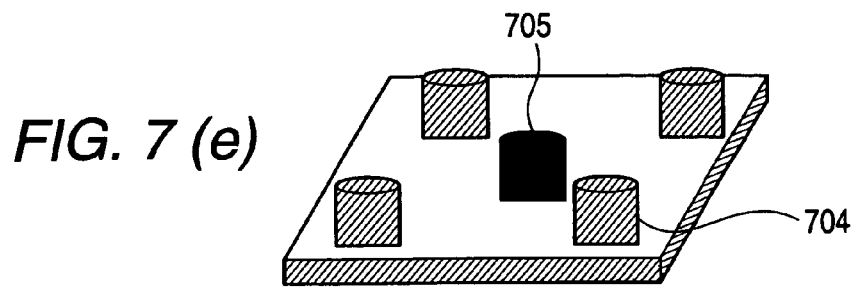

In the following, embodiments of the present invention will be explained with reference to FIGS. 1 to 8. FIG. 1 is a perspective view showing a photonic crystalline structure embodying the present invention, and FIG. 2 is a plan view for explaining an arrangement of dielectric areas in an embodiment of the invention. Also FIGS. 3 and 6 relate to a first embodiment of the invention; FIGS. 4 and 7 relate to a second embodiment of the invention; and FIGS. 5 and 8 relates to a third embodiment of the invention.

(Terms)

At first there will be explained terms to be used in the present description.

A "two-dimensional photonic crystal" means a periodical structured member having a two-dimensional periodical structure of dielectric constant in a direction substantially parallel to a specified plane.

Also a "unit lattice" means a structural member formed by a minimum periodical unit constituting the two-dimensional photonic crystal, has a two-dimensional shape formed by connecting structural members or dielectric areas positioned at outermost corners.

Also a "complete band gap" means a state capable of attenuating an electromagnetic wave such as a light entering the two-dimensional photonic crystal in a direction substantially parallel to the aforementioned specified plane, to a predetermined amount or less, for all the incident angles, and more specifically means a band gap capable of attenuating the incident electromagnetic wave to an extent capable of preparing an ultra small device such as a resonator or a waveguide by forming a point defect or a linear defect.

(Configuration)

In the following, there will be explained, with reference to FIGS. 1 and 2, a configuration of the photonic crystal embodying the present invention.

As shown in FIG. 1, a photonic crystal 100 embodying the present invention is constituted of plural first cylindrical structured members 101, plural second cylindrical structured members 102, and a dielectric area 103 provided around the cylindrical structured members 101 and the cylindrical structured members 102. The first cylindrical structured member 101 constitutes a first dielectric area, and the second cylindrical structured member 102 constitutes a second dielectric area. Owing to these components, the photonic crystal 100 has a two-dimensional periodical structure. In the following the structure of the present embodiment will be explained in more details.

As shown in FIG. 2, the first cylindrical structural members 101 constitute a tetragonal lattice 104, and the photonic crystal of the present embodiment has a periodical structure in which such tetragonal lattice 104 is periodically arranged. Therefore, in the photonic crystal 100, the tetragonal lattice 104 constitutes a unit lattice. Also a side of the tetragonal lattice 104 has a length "a", which is taken as a lattice constant. Also the second cylindrical structural member 102 is provided at an approximate center of each tetragonal lattice 104, and the dielectric area 103 is provided around the first cylindrical structured member 101 and the second cylindrical structured member 102. FIG. 2 shows only a part of the photonic crystal of the present invention, but in practice the structure shown in FIG. 2 is periodically arranged.

The first cylindrical structured member 101 and the second cylindrical structured member 102 are so constructed as to assume a substantially cylindrical shape, with a radius r1 in the first cylindrical structured member 101 and a radius r2 in the second cylindrical structured member 102. Also a relative dielectric constant is taken as $\in 1$ in the first cylindrical structural member 101, $\in 2$ in the second cylindrical structural member 102, and $\in 3$ in the third dielectric area 103.

A complete band gap can be realized by varying the dielectric constant $\in 1$ and the radius r1 of the first cylindrical structural member 101, the dielectric constant $\in 2$ and the radius r2 of the second cylindrical structural member 102, and the dielectric constant $\in 3$ of the third dielectric area 103 under a suitable condition. Specific structures will be explained in following examples.

Also the first dielectric area, the second dielectric area and the third dielectric area can be constituted by a ceramic material, a semiconductor material, a resin or the like, or by air. As a ceramic material, there can be employed, for example, a material based on $BaO—TiO_2$, $BaO—Nd_2O_3—TiO_2$, $TiO_2$, or $Al_2O_3$. Also as a semiconductor material, there can be employed, for example, GaAs, Si or $SiO_2$. Also as a resinous material, there can be employed a polymer material of a high dielectric constant such as a polyvinylidene fluoride resin, a melanine resin, a urea resin, or a polyvinyl fluoride resin.

(Function)

The photonic crystal of the present embodiment having the aforementioned crystal structure can exhibit following advantageous effects.

As a two-dimensional photonic crystal structure is formed by employing a tetragonal lattice with first dielectric areas at the lattice points as a unit lattice, also providing a second dielectric area at an approximate center thereof, and providing a third dielectric area adjacent thereto, a photonic band gap to a TE wave and a photonic band gap to a TM wave are formed in a certain common frequency region for all the incident angles, thereby realizing a complete band gap.

Also the use of a dielectric material other than air for the first dielectric area and the second dielectric area enables preparation of a two-dimensional photonic crystal which is easy to prepare and which has a wide complete band gap. A dielectric material other than air increases a loss in comparison with the case of using air, but such loss can be alleviated by utilizing a ceramic material having a high relative dielectric constant, thus leading to a low loss.

EXAMPLES

In the following, the photonic crystal of the present embodiment will be explained by specific examples.

First Example

At first there will be explained a first example. In a photonic crystal 100 in the first example, a portion where the first cylindrical structural member 101 exists as the first dielectric area and a portion where the second cylindrical structural member 102 exists as the second dielectric area are vacant and are constituted by air. Therefore the first cylindrical structural member 101 and the second cylindrical structural member 102 have relative dielectric constants $\in 1 = \in 2 = 1.0$. Also the third dielectric area 103 is constituted of a material having a relative dielectric constant $\in 3$ of 10.4.

In the first example, a width of the complete band gap was calculated by a simulation conducted by varying the radius r1 of the first cylindrical structural member 101 and the radium r2 of the second cylindrical structural member 102. More specifically, the simulation was conducted by changing the cylindrical radius r1 and the cylindrical radius r2 respectively within a range of 0.1a to 0.5a for calculating the width of the complete band gap. Results of calculation are summarized in FIG. 3.

In the table shown in FIG. 3, the width of the complete band gap is represented in the unit of %. A detailed calculation method for the width of the complete band gap will be explained later, but a width (%) of the complete band gap shown in the table is represented, in case a complete band gap is present continuously for a certain frequency range, by a value obtained by dividing such frequency range with a central frequency of such frequency range. In the table shown in FIG. 3, a column with "–" means that a complete band gap was not formed for the cylindrical radius r1 and the cylindrical radius r2 corresponding to such column. As a result of the simulation, in case of a cylindrical radius r1 of 0.1a, the complete band gap showed a width of 6.39% for a cylindrical radius r2 of 0.35a, and a width of 2.70% for a cylindrical radius r2 of 0.40a. Also in case of a cylindrical radius r1 of 0.2a, the complete band gap showed a width of 2.48% for a cylindrical radius r2 of 0.25a, a width of 2.65% for a cylindrical radius r2 of 0.3a, and a width of 2.60% for a cylindrical radius r2 of 0.35a. Also in case of a cylindrical radius r1 of 0.3a, the complete band gap showed a width of 4.07% for a cylindrical radius r2 of 0.2a, a width of 2.23% for a cylindrical radius r2 of 0.25a, and a width of 1.96% for a cylindrical radius r2 of 0.3a. Also in case of a cylindrical radius r1 of 0.4a, the complete band gap showed a width of 2.70% for a cylindrical radius r2 of 0.05a, and a width of 1.81% for a cylindrical radius r2 of 0.1a.

Therefore, a complete band gap could be obtained within a range where the radius r1 of the first cylindrical structural member 101 and the radius r2 of the second cylindrical structural member 102 satisfy a relation:

$$0.4a \leq r1 + r2 \leq 0.6a.$$

Also the material to be employed is not particularly restricted, and any material capable of showing a relative dielectric constant $\in 3 = 10.4$ in the third dielectric area 103 can provide similar results. A ceramic material is advantageous, but a semiconductor material or a resin may be employed as long as a relative dielectric constant $\in 3=10.4$ can be attained. Further, similar results will be presumably attainable even when the relative dielectric constant $\in 3$ is not 10.4. For example, in case of employing a ceramic material such as sapphire, a wide band gap will be attainable because sapphire has a relative dielectric constant $\in$ of 9.4. Also the material is not limited to such ceramic material but can also be a semiconductor material such as GaAs. GaAs, having a relative dielectric constant $\in$ of 12 to 13, is considered to provide a wide band gap as in the ceramic material.

Then, a complete band gap can be formed by changing the lattice constant a according to the frequency of the electromagnetic wave to be employed (wavelength of the electromagnetic wave). For example, in case a complete band gap can be formed by adopting a lattice constant a=0.5 mm for an electromagnetic wave of a frequency of 300 GHz as an example of a millimeter wave, a complete band gap can be realized for an electromagnetic wave of a frequency of 3 GHz as an example of a microwave by adopting a lattice constant a=50 mm. In this manner, a complete band gap can be obtained for the electromagnetic wave from a millimeter wave region to a microwave region by suitably changing the lattice constant a of the photonic crystal of the invention according to the electromagnetic wave to be employed. Also the lattice constant for a given frequency can be made smaller by increasing the relative dielectric constant $\in$ of the material to be utilized. Therefore, in case the photonic crystal of the invention is applied to a device such as a waveguide or a resonator, such device can be made smaller in dimension by employing a material of a higher relative dielectric constant.

Second Example

In the following, there will be explained a second example. In a photonic crystal 100 in the second example, the first cylindrical structural member 101 constituting a first dielectric area is constituted of a material having a relative dielectric constant $\in 1=10$, while the second cylindrical structural member 102 has a radius r2 same as a radius r1 of the first cylindrical structural member 101. Also the third dielectric area 103 is vacant and is constituted by air. Therefore the third dielectric area 103 has a relative dielectric constant $\in 3=1.0$.

In the second example, a width of the complete band gap was calculated by a simulation conducted by varying the radius r1 of the first cylindrical structural member 101 and the radium r2 of the second cylindrical structural member 102. More specifically, the simulation was conducted by changing the cylindrical radius r1 (=cylindrical radius r2) within a range of 0.2 a to 0.3 a and by changing the relative dielectric constant $\in 2$ within a range of 10 to 50 for calculating the width of the complete band gap. Results of calculation are summarized in FIG. 4. In the table shown in FIG. 4, a column with "−" means that a complete band gap was not formed for the cylindrical radius r1 and the relative dielectric constant $\in 2$ corresponding to such column.

As a result of the simulation, in case of a cylindrical radius r1 of 0.2a, the complete band gap showed a width of 2.65% for a relative dielectric constant $\in 2$ of 20, also a width of 2.84% for a relative dielectric constant $\in 2$ of 30, a width of 1.35% for a relative dielectric constant $\in 2$ of 40, and a width of 2.72% for a relative dielectric constant $\in 2$ of 50. Also in case of a cylindrical radius r1 of 0.25a, the complete band gap showed a width of 1.03% for a relative dielectric constant $\in 2$ of 20, a width of 2.05% for a relative dielectric constant $\in 2$ of 30, a width of 1.72% for a relative dielectric constant $\in 2$ of 40, and a width of 1.88% for a relative dielectric constant $\in 2$ of 50. Also in case of a cylindrical radius r1 of 0.3a, the complete band gap showed a width of 1.96% for a relative dielectric constant $\in 3$ of 40, and a width of 5.61% for a relative dielectric constant $\in 3$ of 50.

Therefore, a complete band gap could be obtained within a range where the radius r1 of the first cylindrical structural member 101 and the radius r2 of the second cylindrical structural member 102 satisfy a relation:

$$0.40a \leq r1+r2 \leq 0.60a,$$

and where the relative dielectric constant $\in 1$ of the first cylindrical structural member 101 and the relative dielectric constant $\in 2$ of the second cylindrical structural member 102 satisfy a relation:

$$\in 2/\in 1 \geq 2.$$

Also as in the first example, a complete band gap can be obtained within a frequency range from the millimeter wave to the microwave, by varying the lattice constant a of the photonic crystal according to the frequency (wavelength) of the incident electromagnetic wave.

Third Example

In the following, there will be explained a third example. In a photonic crystal 100 in the third example, a portion of the first cylindrical structural member 101 constituting a first dielectric area is vacant and is constituted of air. Therefore, the portion of the first cylindrical structural member 101 has a relative dielectric constant $\in 1=1.0$. Also a second cylindrical structural member 102 has a radius r2 same as a radius r1 of the first cylindrical structural member 101. Also the third dielectric area 103 is constituted by a material of a relative dielectric constant $\in 3=10.4$.

In the third example, a width of the complete band gap was calculated by varying the radius r1 of the first cylindrical structural member 101 and the relative dielectric constant $\in 2$ of the second cylindrical structural member 102. More specifically, a simulation was conducted by changing the cylindrical radius r1 (=cylindrical radius r2) within a range of 0.2a to 0.3a and by changing the relative dielectric constant $\in 2$ within a range of 4.0 to 50 for calculating the width of the complete band gap. Results of calculation are summarized in FIG. 5. In the table shown in FIG. 5, a column with "−" means that a complete band gap was not formed for the cylindrical radius r1 (=cylindrical radius r2) and the relative dielectric constant $\in 2$ corresponding to such column.

As a result of the simulation, in case of a cylindrical radius r1 of 0.25a, the complete band gap showed a width of 12.67% for a relative dielectric constant $\in 2$ of 50. Also in case of a cylindrical radius r1 of 0.3a, the complete band gap showed a width of 3.56% for a relative dielectric constant $\in 2$ of 22, a width of 11.95% for a relative dielectric constant $\in 2$ of 32, and a width of 20.87% for a relative dielectric constant $\in 2$ of 50.

Therefore, a complete band gap could be obtained within a range where the radius r1 of the first cylindrical structural member 101 and the radius r2 of the second cylindrical structural member 102 satisfy a relation:

$$0.50a \leq r1+r2 \leq 0.60a,$$

and where the relative dielectric constant ∈1 of the first cylindrical structural member 101 and the relative dielectric constant ∈2 of the second cylindrical structural member 102 satisfy a relation:

∈2/∈1≧20.

Also as in the first example, a complete band gap can be obtained within a frequency range from the millimeter wave to the microwave, by varying the lattice constant a of the photonic crystal according to the frequency (wavelength) of the incident electromagnetic wave.

(Calculation Method for Complete Band Gap)

In the following, there will be explained a method of calculating the width of the complete band gap by the aforementioned simulation. For calculating the photonic band gap of the photonic crystal embodying the present invention, a transmission characteristic simulator "Translight" for the photonic crystal was adopted. This software was developed by Andrew Reynolds during his stay at Glasgow University, and utilizes a transfer matrix method for calculation. It calculates, on a photonic crystalline structure formed by an assembly of an arbitrary arrangement of cylinders and polygonal prisms, reflection and transmission characteristics for an incident electromagnetic wave (TE wave and TM wave) at an arbitrary incident angle.

Now reference is made to FIG. 1 for explaining the incident angle of the electromagnetic wave. For the purpose of convenience, a direction perpendicular to a plane on which the cylindrical structural members are periodically arranged in a tetragonal lattice will be called a z-axis direction. Also a direction of perpendicular entry of an electromagnetic wave 105 into the photonic crystal 100 will be called y-axis, and a direction perpendicular to the y-axis and the z-axis will be called an x-axis. Also an incident angle θ of the electromagnetic wave 105 is taken as 90° when it enters the photonic crystal 100 perpendicularly (in y-axis direction), then becomes smaller towards the x-axis direction and becomes 0° in a direction parallel to the x-axis. The incident angle of the electromagnetic wave 105 can be selected arbitrarily within a range of θ=0°–90°, and reflection and transmission characteristics can be obtained for an arbitrary frequency region.

The simulator can calculate the reflection and transmission characteristics of the photonic crystalline structure, by utilizing a shape of the photonic crystalline structure for which the reflection and transmission characteristics are desired, a frequency region, an incident angle range of the electromagnetic wave (TE wave and TM wave), and relative dielectric constants of the employed materials. In the calculation, there was employed an incident angle range of 0–90°. As the photonic crystal 100 embodying the present invention is symmetrical for the x-y plane, such incident angle range allows calculation for all the incident electromagnetic wave entering from the x-z plane.

A calculation by the simulator provided reflective and transmission attenuations as a function of the frequency, at each incident angle of the electromagnetic wave (TE wave and TM wave). A band gap generation was recognized in case the transmission attenuation became 20 dB or larger. In case a band gap is generated at a certain frequency for all the incident angles (θ=0–90°), a complete band gap is formed at such frequency. In case the complete band gap exists continuously over certain frequencies, a complete band gap width (%) is defined by dividing a range of such frequencies by a central frequency of such range. Also in case complete band gaps are present separately in discrete frequency ranges, a complete band gap width was calculated by summing the band gap widths present within a normalized frequency range of 0.001–1,000.

(Producing Method for Two-Dimensional Photonic Crystal)

In the following, a producing method for the two-dimensional photonic crystal of the present embodiment will be explained. For example, a simultaneous calcining technology can be utilized in case of producing a two-dimensional photonic crystal with a ceramic material, and a semiconductor film forming technology can be utilized in case of producing a two-dimensional photonic crystal with a semiconductor materials Also a photoforming method can be utilized in case of producing a two-dimensional photonic crystal with a photosettable resin.

At first there will be explained a method for producing a two-dimensional photonic crystal with a ceramic material. FIG. 6 shows a producing process of the photonic crystal 100 in the first example. At first, as shown in (a) in FIG. 6, plural green sheets 601 are prepared with a ceramic material constituting the third dielectric area 103. Then, as shown in (b), the plural green sheets 601 are superposed in a metal mold and laminated by pressing under heating. Then, as shown in (c), the laminated plate is dry etched from above utilizing a predetermined mask, thereby forming plural cylindrical holes 602 and cylindrical holes 603 arranged periodically. In the first example, the cylindrical holes 602 constitute the first dielectric areas, while the cylindrical holes 603 constitute the second dielectric areas.

In the following the second example will be explained with reference to FIG. 7. At first, as shown in (a) in FIG. 7, a green sheet 701 is prepared with a ceramic material for the first cylindrical structural member 101 constituting the first dielectric area. Similarly a green sheet 702 is prepared with a ceramic material for the second cylindrical structural member 102 constituting the second dielectric area. Then, as shown in (b) in FIG. 7, the green sheet 701 for the first cylindrical structural member and plural green sheets 702 for the second cylindrical structural member 102 superposed thereon are placed in a metal mold and laminated by pressing under heating.

Then, as shown in FIG. 7(c) which is a cross-sectional view of (b), the second dielectric area is removed by dry etching in a predetermined area, utilizing a predetermined mask, until the first dielectric area is exposed, thereby forming plural cylindrical holes 703 arranged periodically. Then, as shown in FIG. 7(d), cylinders 704 constituting the first dielectric areas are formed by an epitaxial crystal growth in the cylindrical holes, up to an upper surface. Similarly, cylinders 705 constituting the second dielectric areas formed by an epitaxial crystal growth in the cylindrical holes. Then, a dry etching is executed with a predetermined mask to form cylinders 704 and cylinders 705 as shown in FIG. 7(e). The cylinders 704 constitute the first cylindrical structural members 101, and the cylinders 705 constitute the second cylindrical structural members 102.

Figure 8:
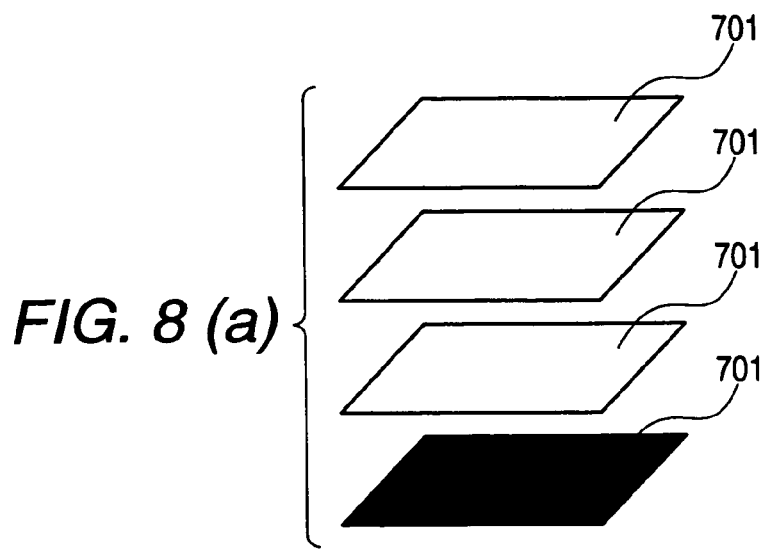
FIG. 8 is a view showing a manufacturing process of a photonic crystal in a third embodiment of the invention.
Figure 8:
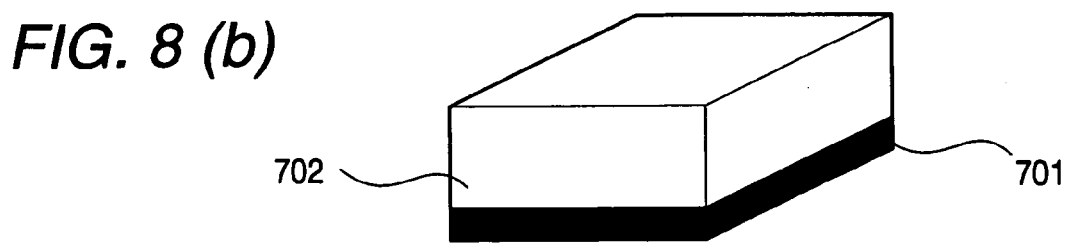
Figure 8:
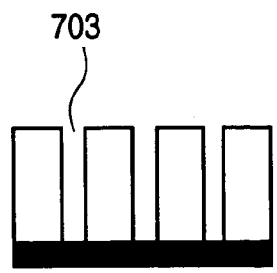
Figure 8:
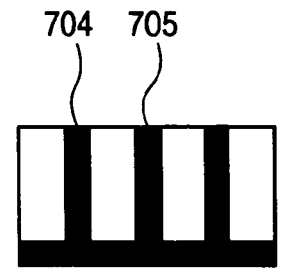
Figure 8:
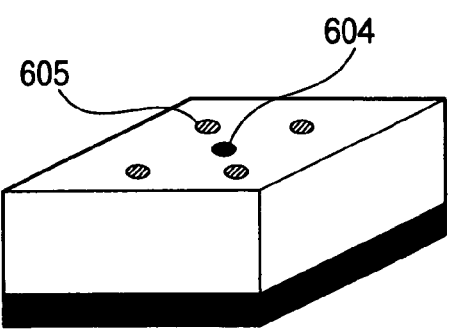

In the following a producing method for the photonic crystal 100 in the third example will be explained with reference to FIG. 8. At first, as shown in (a) in FIG. 8, a green sheet 801 is prepared with a ceramic material for the second cylindrical structural member 102 constituting the second dielectric area. Similarly a green sheet 802 is prepared with a ceramic material for the third dielectric area 103. Then, as shown in (b) in FIG. 8, the green sheet 801 for the second cylindrical structural member and plural green sheets 802 for the third dielectric area 103 superposed thereon are placed in a metal mold and laminated by pressing under heating.

Then, as shown in FIG. 8(c) which is a cross-sectional view of (b), the third dielectric area is removed by dry etching in a predetermined area, utilizing a predetermined mask, until the material constituting the the second dielectric area is exposed, thereby forming plural cylindrical holes 803 arranged periodically. Then, as shown in FIG. 8(d), second dielectric areas 804 are formed by an epitaxial crystal growth in the cylindrical holes, up to an upper surface. Then, a dry etching is executed with a predetermined mask to form plural cylindrical holes 805 arranged periodically and constituting the first dielectric areas, as shown in FIG. 8(e).

Thereafter the laminate is divided into a desired shape and calcined to obtain a photonic crystal in which different dielectric members are calcined simultaneously. Through this process, the first dielectric areas are constituted of air, while the second dielectric areas are formed by the second cylindrical structural members 102 of a ceramic material, and the third dielectric areas 103 are formed therearound with a ceramic material different from that of the second dielectric areas.

In case of producing the two-dimensional photonic crystal of the invention with a semiconductor material, a mask pattern can be prepared by a photolithographic technology and a desired shape can be obtained by a dry etching.

Also in a photoforming method, a photosettable resin in a liquid state is irradiated with an ultraviolet beam to cause a polymerization reaction in the irradiated area only, whereby the photosettable resin is hardened into a desired shape.

(Other Embodiments)

In the foregoing explanation, the two-dimensional photonic crystal is assumed to have a tetragonal unit lattice, but such case is not restrictive.

Figure 9:
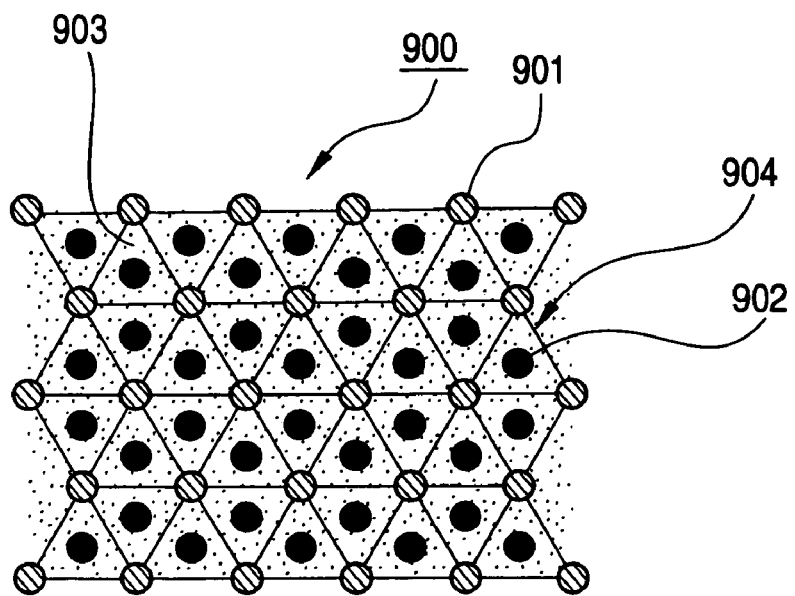
FIG. 9 is a schematic view showing a photonic crystal in another embodiment.

FIG. 9 shows another embodiment of the photonic crystal of the invention.

A photonic crystal 900 shown in FIG. 9 is constituted of plural first cylindrical structural members 901, plural second cylindrical structural members 902, and a dielectric area 903 provided around the first cylindrical structural members 901 and the second cylindrical structural members 902. In this case, the first cylindrical structural member 901 constitutes a first dielectric area, and the second cylindrical structural member 902 constitutes a second dielectric area.

As shown in FIG. 9, the first cylindrical structural members 901 are positioned at apices of an equilateral triangle and thus constitute a trigonal lattice 904. Thus the photonic crystal 900 has a periodical structure in which a trigonal unit lattice 904 is periodically arranged. A second cylindrical structural member 902 is provided at an approximate center (vicinity of center of gravity) of each trigonal lattice 904, and a dielectric area 904 is provided around the first cylindrical structural members 901 and the second cylindrical structural members 902. FIG. 9 shows only a part of the photonic crystal 900, but in fact the structure shown in FIG. 9 is periodically arranged.

A complete band gap can be realized even in a trigonal lattice by varying the dielectric constant $\in 1$ and the radius r1 of the first cylindrical structural member 901, the dielectric constant $\in 2$ and the radius r2 of the second cylindrical structural member 902, and the dielectric constant $\in 3$ of the third dielectric area 903 under a suitable condition.

Figure 10:
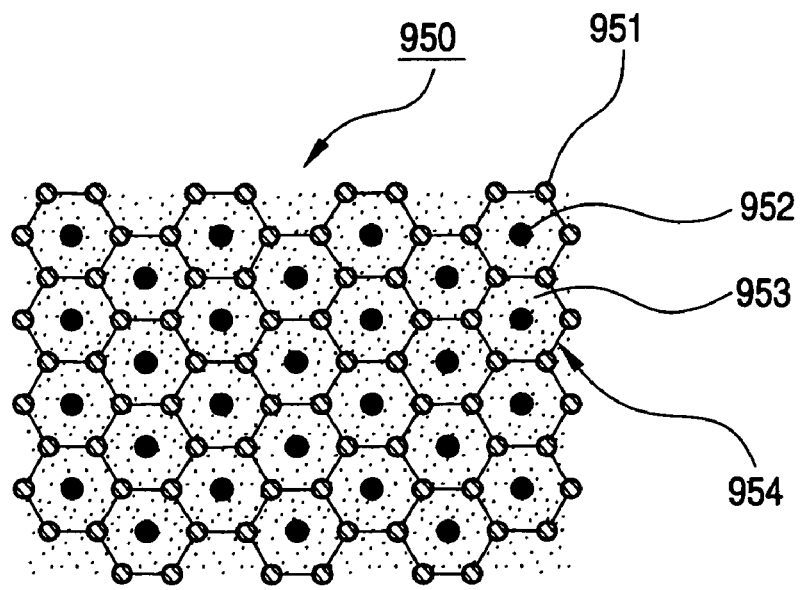
FIG. 10 is a schematic view showing a photonic crystal in still another embodiment.

FIG. 10 shows still another embodiment of the photonic crystal of the invention.

A photonic crystal 950 shown in FIG. 10 is constituted of plural first cylindrical structural members 951, plural second cylindrical structural members 952, and a dielectric area 953 provided around the first cylindrical structural members 951 and the second cylindrical structural members 952. In this case, the first cylindrical structural member 951 constitutes a first dielectric area, and the second cylindrical structural member 952 constitutes a second dielectric area.

As shown in FIG. 10, the first cylindrical structural members 951 are positioned at apices of an equilateral hexagon and thus constitute a hexagonal lattice 954. Thus the photonic crystal 950 has a periodical structure in which a hexagonal unit lattice 954 is periodically arranged. A second cylindrical structural member 952 is provided at an approximate center (vicinity of center of gravity) of each hexagonal lattice 954, and a dielectric area 953 constituting the third dielectric area is provided around the first cylindrical structural members 951 and the second cylindrical structural members 952. FIG. 10 shows only a part of the photonic crystal 950, but in fact the structure shown in FIG. 10 is periodically arranged.

A complete band gap can be realized even in a hexagonal lattice by varying the dielectric constant $\in 1$ and the radius r1 of the first cylindrical structural member 951, the dielectric constant $\in 2$ and the radius r2 of the second cylindrical structural member 952, and the dielectric constant $\in 3$ of the third dielectric area 903 under a suitable condition.

As explained in the foregoing, it is rendered possible to form a complete band gap even in a unit lattice of an equilateral polygonal shape, by suitably regulating the dielectric constant and the cylindrical radius of the first dielectric area, the second dielectric area and the third dielectric area.

Also the first, second and third dielectric areas are not limited to a cylindrical shape but may have a polygonal prism shape. Also the unit lattice is not limited to a shape of an equilateral polygon, but may have a shape allowing easy two-dimensional arrangement, and the photonic crystal may be formed by unit lattices of plural kinds.

(Applications)

The photonic crystal of the present invention is applicable to various devices, and the dimension of the device can be made ultra small by utilizing a photonic crystal. For example, the photonic crystal of the invention can be utilized for producing a waveguide. In such case, by introducing a linear defect into the photonic crystal, a defect level is formed in the portion of such linear defect, and the electromagnetic wave can exist only in such defect level. Therefore a waveguide is formed by a photonic band gap.

In case of an optical waveguide for a light, such optical waveguide has a dimension of several hundred nanometers or less and can therefore confine the light within a space that is smaller by more than 10 times in comparison with an optical fiber. Also a waveguide prepared with a photonic crystal does not cause a scattered leakage of light to the exterior even in a steep bend, whereby an ultra small circuit can be realized.

Also the photonic crystal structure of the invention can be applied to an ultra small resonator by introducing a point defect therein, because the electromagnetic wave can exist only in a portion of such point defect and is confined therein by a surrounding band gap.

INDUSTRIAL APPLICABILITY

The photonic crystal of the invention can realize a complete band gap, by providing a second dielectric area at the approximate center of each tetragonal lattice which is formed by first dielectric areas and is arranged periodically, and providing a third dielectric area therearound. Also such photonic crystal can be produced easily as it is a two-dimensional photonic crystal having a tetragonal lattice as a unit lattice.

It is also possible to prepare a two-dimensional photonic crystal having a wide complete band gap by singly utilizing a material of a relative dielectric constant, particularly a ceramic material.

It is also rendered possible to obtain a complete band gap for the electromagnetic wave of a wavelength range from a millimeter wave to a microwave, by varying the lattice constant of the tetragonal lattice according to the wavelength of the electromagnetic wave to be used.

It is further rendered possible to obtain a wide complete band gap and to reduce a size of a device utilizing the photonic crystal, by constituting the periodically arranged tetragonal lattice with a dielectric material other than air.

Furthermore, the photonic crystal of the invention can be applied to a waveguide or a resonator, thereby enabling an ultra miniaturization of these devices.

The invention claimed is:

1. A two-dimensional photonic crystal formed by a periodical two-dimensional arrangement of plural unit lattices, comprising:
    a prism-shaped first dielectric area arranged at each lattice point of each unit lattice;
    a prism-shaped second dielectric area arranged at an approximate center of each unit lattice; and
    a third dielectric area adjacent to and around the first and second dielectric areas, wherein
        the third dielectric area has a relative dielectric constant different from relative dielectric constants of the first and second dielectric areas,
        the unit lattice is a tetragonal lattice, and
        the first dielectric area and the second dielectric area have a substantially cylindrical shape and satisfy a relationship:

$0.4a \leq r1+r2 \leq 0.6a$, wherein r1 indicates a radius of the cylindrical first dielectric area, r2 indicates a radius of the cylindrical second dielectric area, and a indicates a unit length of a lattice axis of the tetragonal lattice.

2. A two-dimensional photonic crystal according to claim 1 wherein a relative dielectric constant $\in 1$ of the first dielectric area is equal to a relative dielectric constant $\in 2$ of the second dielectric area.

3. A two-dimensional photonic crystal according to claim 1, wherein the first and second dielectric areas are formed by air and the third dielectric area is formed by a dielectric material containing a ceramic material.

4. A two-dimensional photonic crystal formed by a periodical two-dimensional arrangement of plural unit lattices, comprising:
    a prism-shaped first dielectric area arranged at each lattice point of each unit lattice;
    a prism-shaped second dielectric area arranged at an approximate center of each unit lattice; and
    a third dielectric area adjacent to and around the first and second dielectric areas, the third dielectric area having a relative dielectric constant different from relative dielectric constants of the first and second dielectric areas,
    wherein a relative dielectric constant $\in 1$ of the first dielectric area, a relative dielectric constant $\in 2$ of the second dielectric area, and a relative dielectric constant $\in 3$ of the third dielectric area satisfy relations:

$\in 3 > \in 1$, and $\in 2/\in 1 > 20$.

5. A two-dimensional photonic crystal according to claim 4 wherein the unit lattice is a tetragonal lattice.

6. A two-dimensional photonic crystal according to claim 5, wherein a relative dielectric constant $\in 1$ of the first dielectric area is smaller than a relative dielectric constant $\in 2$ of the second dielectric area.

7. A two-dimensional photonic crystal according to any one of claims 6, wherein a relative dielectric constant $\in 3$ of the third dielectric area satisfies at least a relation $\in 3 \times \in 1$.

8. A two-dimensional photonic crystal according to any one of claims 1–6, wherein the first and second dielectric areas are formed by a dielectric material containing a ceramic material and the third dielectric area is formed by air.

9. A two-dimensional photonic crystal according to any one of claims 1–6, and 8, wherein the first, second and third dielectric areas are formed by a dielectric material containing a ceramic material.

10. A two-dimensional photonic crystal according to any one of claims 6, and 4, wherein a unit length a of the lattice axis of the tetragonal lattice is different depending on a frequency of a light or an electromagnetic wave entering the two-dimensional photonic crystal.

11. A photonic crystal waveguide including a two-dimensional photonic crystal according to any one of claims 1–6, and 4, wherein a linear defect is formed in a periodical lattice arrangement of the two-dimensional photonic crystal.

12. A photonic crystal resonator including a two-dimensional photonic crystal according to any one of claims 1–6, and 4, wherein a point-shaped defect is formed in a periodical lattice arrangement of the two-dimensional photonic crystal.

13. A two-dimensional photonic crystal formed by a periodical two-dimensional arrangement of plural unit lattices, comprising:
    a prism-shaped first dielectric area arranged at each lattice point of each unit lattice;
    a prism-shaped second dielectric area arranged at an approximate center of each unit lattice; and
    a third dielectric area adjacent to and around the first and second dielectric areas, the third dielectric area having a relative dielectric constant different from relative dielectric constants of the first and second dielectric areas,
    wherein the first and second dielectric areas are formed by air and the third dielectric area is formed by a dielectric material containing a ceramic material.

14. A two-dimensional photonic crystal formed by a periodical two-dimensional arrangement of plural unit lattices, comprising:
    a prism-shaped first dielectric area arranged at each lattice point of each unit lattice;
    a prism-shaped second dielectric area arranged at an approximate center of each unit lattice; and
    a third dielectric area adjacent to and around the first and second dielectric areas, the third dielectric area having a relative dielectric constant different from relative dielectric constants of the first and second dielectric areas,
    wherein the first and second dielectric areas are formed by a dielectric material containing a ceramic material and the third dielectric area is formed by air.

* * * * *